United States Patent [19]

Peppmöller et al.

[11] Patent Number: 4,711,919

[45] Date of Patent: Dec. 8, 1987

[54] WATER-SOLUBLE POLYMERS PLUS NATURAL RESINS SIZING AGENT

[75] Inventors: Reinmar Peppmöller, Krefeld; Friedlieb Koschier, Sippersfeld, both of Fed. Rep. of Germany

[73] Assignee: Chemische Fabrik Stockhausen GmbH, Krefeld, Fed. Rep. of Germany

[21] Appl. No.: 701,064

[22] Filed: Feb. 13, 1985

[30] Foreign Application Priority Data

Feb. 13, 1984 [DE] Fed. Rep. of Germany ....... 3405019

[51] Int. Cl.$^4$ ..................... C08L 93/00; C08L 93/04
[52] U.S. Cl. ..................... 524/77; 524/270; 524/271; 524/272
[58] Field of Search ............... 524/270, 271, 272, 77

[56] References Cited

U.S. PATENT DOCUMENTS

| | | | |
|---|---|---|---|
| 2,343,095 | 2/1941 | Smith | 524/272 |
| 3,804,788 | 4/1974 | Fuhaoka et al. | 524/272 |
| 4,328,141 | 5/1982 | Farewell et al. | 524/272 |
| 4,333,795 | 6/1982 | Street | 524/272 |

FOREIGN PATENT DOCUMENTS 663445 8/1938 Fed. Rep. of Germany.
1617204 12/1970 Fed. Rep. of Germany.

OTHER PUBLICATIONS

Abstract Bulletin of the Institute of Paper Chemistry, vol. 53, No. 9, Mar. 1983, p. 1070.
Encyclopedia of Polymer Science and Technology, vol. 1, pp. 190–192.
Kirk/Othmer, vol. 17, p. 478 (1968).

*Primary Examiner*—Allan M. Lieberman
*Attorney, Agent, or Firm*—Sprung Horn Kramer & Woods

[57] ABSTRACT

The present invention relates to mixtures of water-soluble synthetic anionic polymers consisting of at least 80%-wt. acrylamide and/or methacrylamide and sizing media based on partly or totally saponified natural resins as well as the use of such mixtures in the production of paper and cardboard in order to reduce the absorbency and improve the dry strength of these products.

10 Claims, No Drawings

WATER-SOLUBLE POLYMERS PLUS NATURAL RESINS SIZING AGENT

The object of the present invention are mixtures of water-soluble, saponified (meth)acrylic polymers and resin size products based on at least partially saponified, enriched/concentrated or non-enriched/non-concentrated natural resins, and their use as sizing agents in the production of paper and cardboard.

In many areas of technology (for example, in the production of soap, cleaning and polishing agents, cement, the paper industry), saponification products of natural resins, the so-called resin sizes, have been used for a considerable time. In particular, in the paper industry it is usual to provide paper and cardboard with sizing agents that are added to the production material in order to reduce the natural tendency of all paper materials to take up aqueous liquids by capillary action. Reduction of the natural absorbency of paper and cardboard is required if the hydrophilic printing dyes and colours or inks that are applied to the surface of such materials are to remain in sharply defined areas. As has been stated, the desired degree of resistance to the penetration of hydrophilic liquids is achieved by sizing the paper. In general, one proceeds, even today, from natural resins or waxes when producing suitable sizing agents. Such natural waxes and resins are saponified, completely or in part and then, dissolved or dispersed in water, are added to the production mass, to which fillers, retention agents, and other substances have been added. As a rule, a natural resin such as balsam resin, wood resin, tallol resin. or the like is used as the starting material, and this is treated with alkali, such as caustic soda (DE-OS No. 14 67 559). Either the whole resin is saponified (complete saponification) or only a part of it, so that "free" resin remains in the resin size (the so-called free-resin size). The degree of saponification of the resin sizes is determined by their degree of solubility in water. With complete saponification of the resin, clear resin soap solutions are obtained. Incomplete saponification of the resins results in dispersions with a high proportion of "free resin."

The resin sizes obtained by treatment with alkali are anionic and are, as a rule, precipitated in the paper material with aluminum salts, usually aluminum sulfate or alum and then fixed. The size particles imbedded in the paper structure have a water-repellant action and for this reason reduce the wettability and the absorbency of paper products. However, the mechanical strength of the sized product decreases as increasing quantities of resin size are used, this taking place because of the increasing reduction of inter-fibre bonds.

Aqueous solutions of colophony resins that have been saponified only partially with a base, preferably with sodium or potassium hydroxide, are usually used as free-resin size for sizing paper and cardboard. Frequently a protective colloid, for example casein, is added to these products as a stabilizer. Such dispersions of natural resin, which are rich in free resin, and which are designated Bewoid resins after the associated production process, are characterized by greater effectiveness compared to fully-saponified resin sizes.

In the same way, it has for some time been known that "enriched" colophony resins can be obtained by conversion of natural resins with formaldehyde and/or alpha,beta-unsaturated carboxylic acids; these result in more effective fully-saponified resin sizes or Bewoid-type dispersions that contain free resin.

Proceeding from this state of the art, it is the task of the present invention to create a product that is greatly improved in its sizing effect, that achieves the desired reduction of the capillary absorbency of the paper for smaller concentrations of the substances used, and imparts greater mechanical strength to the paper or cardboard that is sized.

According to the present invention, this has been done by producing a mixture that contains the following:

(a) at least one synthetic, anionic water-soluble polymer, containing at least 80%-wt acrylamide and/or methacrylamide (component A);

(b) at least one sizing medium based on a completely saponified natural resin (component B); and/or at least one sizing medium based on a partially saponified natural resin (component C).

Component A can consist of one or a plurality of water-soluble polymer acids and/or at least one water-soluble polymer salt, water-soluble alkali- and/or ammonium salts being particularly suitable. These can be used completely or in part as water-soluble salts.

Polymers that are suitable as component A are partially saponified polyacrylamide, partially saponified methacrylamide, copolymers of acrylic acid and/or methacrylic acid with methacrylamide, acrylonitrile, methacrylonitrile, vinyl acetate, maleic acid anhydride, diisobutane, ethylacetate and/or methacrylate, or mixtures of these products, used preferably in the form of their water-soluble alkali- and/or ammonium salts. These polymers are produced by the known method, for example according to U.S. Pat. No. 2,819,189, from the corresponding monomers. Polymerization takes place preferably in water, in the presence of free radical initiators as polymerisation catalysts. Monomer acids as well as the monomer salts can be used for polymerisation. A preferred variation of the process for the production of the ingredients of component A is that during polymerisation of the monomers to the polymers of component A the pH value is dropped to below 7. The pH value is then raised on the addition to components B and/or C during preparation of the mixture according to the present invention.

In like manner it is also possible to isolate the products obtained during precipitation polymerization or solution polymerization. After drying, the powder or granulate that is obtained is used as component A of the mixture according to the present invention.

The polymers of component A must contain at least 80%-wt, preferably 90%-wt, acrylamide and/or methacrylamide, 0–5%-wt acrylonitrile, methacrylonitrile, vinyl acetate, maleic acid anhydride, diisobutane, (meth)acrylic acid ester of monovalent primary alcohols with 1–4 C atoms and 5–20%-wt acrylic acid and/or methacrylic acid. These are preferably used as alkali and/or ammonium salts.

The viscosity of a 2% aqueous solution of the polymers of component A at 20° C. lies between 5 and 100 mPa×s, preferably between 20 and 70 mPa×s (Brookfield RV 20 min$^{-1}$, measuring body I).

Completely saponified, preferably enriched resin sizes that have been extracted from natural resin colophony, such as tallol colophony are suitable for component B. Combinations of component A with dispersions that contain free resin (component C), the pH value of which usually lies between 6 and 7, are well tolerated.

Polymers with a pH value of 11–12, whose carboxylic acid content is more than 4 mMol per gram, should be used as component A for mixing with fully saponified enriched resin sizes (component B) so as to avoid any eventual precipitation.

A typical mixture according to the present invention, which uses a fully saponified resin size is made up as follows:

3–50%-wt, preferably 5–25%-wt, component A
50–97%-wt, preferably 80–95%-wt component B The percentage-weight quantities cited relate to the dry weight of the components.

The components A and B can be mixed with each other in the form of powders or as an aqueous solution in the above-quoted proportions. Since the polymer salt brings about a sharper increase in the viscosity of the aqueous solution than comparable quantities of resin soap, pourable high-percentage solutions have a surplus of component B (fully saponified resin size).

Sixteen parts by weight of water are required to liquify a sizing medium of the resin soap type that is composed, for example, of from 3 parts by weight of resin size and 1 part by weight of polymer salt, so that a 20% solution results.

In the case of dispersion resin sizes of the Bewoid type (component C) as well, a mixture ratio of 3–50%-wt component A
50–97%-wt component C should be maintained, relative to the dry weight of the components. Additional substances such as preservatives, colouring agents, odourizers, moisteners and protective colloids can also be added to the liquid sizing medium. It is preferred that the mixtures according to the present invention be used as 20–70% solutions for sizing purposes.

Normally, the mixtures according to the present invention will be added to the fibre suspension in the machine vats when used for the production of paper and cardboard. They can, however, be added after mechanical grinding of the fibre material, or in the thinned material area between the machine vats and the material output from the paper-making machinery. Of great importance for fixing the sizing medium in the paper structure is the pH value of the fibre suspension, that is adjusted to 4.3 to 4.6 with aluminum sulfate.

Whereas in conventional sizes with increasing concentrations that are used, the degree of sizing of the paper increases, the dry strength is nevertheless reduced, the mixtures according to the present invention bring about more effective sizing and at the same time an increase in the strength of the paper. The fixing of the polymer components A and the sizing components B and C with aluminum salts (alum), which takes place simultaneously in the mixtures according to the present invention, permits an improved use of the sizing dry substance of fully or partially saponified resin size. In filled paper, the mixtures according to the present invention bring about increased retention of the filler. The percentage increase in the degree of sizing and in the dry strength depends on the type of fibre material, the degree of grinding, and other additives such as clay, kaolin, chalk, titanium dioxide, and the presence of other papermaking additives.

The concentration range of the mixtures according to the present invention, relative to the dry substance, in conventional resin sizes is selected according to the desired degree of sizing, as is the case with conventional resin sizes, and at the maximum is at approximately 4%-wt of the weight of the paper.

The mixture according to the present invention, that displays anionic charge characteristics, entails particular advantages if in part, instead of the aluminum salts such as aluminum sulfate or alum, normally used as a precipitating agent, cationic polymers of medium molecular weight are used. Expediently, cationized copolymers of acrylamide are obtained with dialkylaminoacrylates with 1–4 C atoms in the alcoholate radical or corresponding methacrylates, and also with Mannich products, as can be obtained by conversion of polyacrylamide with formaldehyde and dialkylamines. The use of the mixture according to the present invention in the presence of a cationic polymer leads to the fact that the percentage increases of the dry strength and of the degree of sizing in paper material are somewhat higher than with the use of the mixture according to the present invention with aluminum salts alone. Noteworthy is the fact that the sequence of addition of the products can have a marked effect on the results. A suspension of paper material that already contains a cationic polymer can result in a paper with outstanding dry strength on the addition of the mixture according to the present invention; on the other hand, a suspension of paper material into which the sizing agent has first been metered can result in a paper with a higher degree of sizing.

The present invention is explained on the basis of the following examples:

EXAMPLE 1

10 g acrylic acid and 2 g methacrylic acid with 86 g acrylamide and 2 g acrylonitrile were polymerized by a known method in 899 g water that contained 1 g caustic soda (45%), with $K_2S_2O_8$ as catalyst. The polymer was subsequently adjusted to a pH value of 5–6 with caustic soda (A1). The viscosity of the 2%-wt solution adjusted to pH 9 with caustic soda amounts to 53 mPa×s (Brookfield MK I/20).

In order to make the mixture according to the present invention, 60 parts by weight of component B (fully saponified, chemically enriched resin size with a solids content of 50%) was mixed with 100 parts by weight of component A (A1) with stirring. An additional 40 parts by weight distilled water was added during stirring.

The mixture is a slightly viscous, clear brown solution that stored well and can be used in the same manner as a commercially available resin size. The mixture contains 20%-wt dry substance; the materials ratio of component B to component A (A1) is 75:25%.

EXAMPLE 1a 10 g acrylic acid and 2 g methacrylic acid with 86 g acrylamide and 2 g acrylonitrile were polymerized by a known method in 899 g water that contained 1 g caustic soda (45%), with $K_2S_2O_8$ as catalyst. The polymer was subsequently adjusted to a pH value of 5–6 with caustic soda (A1a). The viscosity of the 2%-wt solution adjusted to pH 9 with caustic soda amounts to 53 mPa×s (Brookfield MK I/20).

In order to make the mixture according to the present invention, 83.7 parts by weight of component B (fully saponified, chemically enriched resin size with a solids content of 50%) was mixed with 46.5 parts by weight of component A (A1a) with stirring. An additional 69.8 parts by weight distilled water was added during stirring.

The mixture is slightly viscous, clear brown solution that stores well and can be used in the same manner as a commercially available resin size. The mixture contains 23.3%-wt dry substance; the materials ratio of component B to component A (A1) is 90:10%.

EXAMPLE 1b 10 g acrylic acid and 2 g methacrylic acid with 86 g acrylamide and 2 g acrylnitrile were polymerized by a known method in 899 g water that contained 1 g caustic soda (45%), with $K_2S_2O_8$ as catalyst. The polymer was subsequently adjusted to a pH value of 5–6 with caustic soda (A1b). The viscosity of the 2%-wt solution adjusted to pH 9 with caustic soda amounts to 53 mPa×s (Brookfield MK I/20).

In order to make the mixture according to the present invention, 86.4 parts by weight of component B (fully saponified, chemically enriched resin size with a solids content of 50%) was mixed with 22.7 parts by weight of component A (A1b) with stirring. An additional 90.9 parts by weight distilled water was added during stirring.

The mixture is a slightly viscous, clear brown solution that stores well and can be used in the same manner as a commercially available resin size. The mixture contains 22.7%-wt dry substance; the materials ratio of component B to component A (A1) is 95:5%.

EXAMPLE 2

10 g acrylic acid and 2 g maleic acid anhydride were converted to a copolymer with 86 g acrylamide and 2 g methacrylate as in Example 1, in the presence of $K_2S_2O_8$ and caustic soda, in an aqueous solution and partially neutralized to pH=5–6. The viscosity of the 2%-wt solution of the polymer (A2) is 31 mPa×s (Brookfield MK I/5) Upm; pH=9). The dry substance of the polymer solution was adjusted to 10%. In order to produce a mixture according to the invention, 60 parts by weight of component B (fully saponified, chemically enriched resin size) was mixed with 100 parts by weight component A (A2). 40 parts by weight distilled water was added to this mixture whilst stirring.

The sizing medium so obtained is a slightly viscous, clear brown solution that stores well and can be used like a commercial resin size. The dry substance of the mixture amounts to 20%-wt at a ratio of component BGA/component A (A2) of 75:25%.

EXAMPLE 3

The polymer (A1) produced according to Example 1 was used for this mixture. A commercial dispersion resin size (partially saponified resin dispersion produced from an enriched tallol resin colophony) was selected as component C. The solids content of this dispersion amounts to 30%-wt.

50 parts by weight of polymer (A1) was mixed with 50 parts by weight of component C to produce the mixture. In this case no water was added. The mixture is a mid-viscosity dispersion that stores well and can be used in the same way as a commercial Bewoid resin size. The mixture contains 20%-wt dry substance. The materials ratio of component C/component A (A1) is 75:25%.

EXAMPLE 3a

The polymer (A1) produced according to Example 1 was used for the mixture. A commercial dispersion resin size (partially saponified resin dispersion produced from an enriched tallol resin colophonium) was selected as component C. The solids content of this dispersion amounts to 30%-wt.

25 parts by weight of polymer (A1) was mixed with 75 parts by weight of component C to produce the mixture. In this case no water was added. The mixture is a mid-viscosity dispersion that stores well and can be used in the same way as a commercial Bewoid resin size. The mixture contains 25%-wt dry substance. The materials ratio of component C/component A (A1) is 90:10%.

CHECKING THE EFFECTIVENESS OF THE SIZING MEDIUM

In order to check the sizing medium for effectiveness in comparison with conventional resin sizes test sheets were produced on the RK sheet former in accordance with the standard methods as in Specification Sheet 108 published by the Verein Zellcheming. These sample sheets were tested for both degree of sizing and for dry strength.

A Cobb system test apparatus was used to test for degree of sizing; this apparatus also permitted testing for sizing on RK sheets with a 10 cm$^2$ test surface. Burst testing with a Mullen tester was used as a reliable method to determine dry strength of the sheet structure.

In order to obtain test sheets with the most homogenous possible formation and minimal dispersion of their characteristics (bleached) book sulfite cellular material ground to varying degrees in a Vally-Hollaender was used. The surface weight of the test sheets was 100 g/m$^2$ in all cases.

The sizing medium was fixed in a standardized method by the addition of 3%-wt aluminum sulfate to the sludge. All dosings of the sizing medium in the subsequent applications are related to the quantity of resin size dry substance added to the atro paper material. China clay was used as a filler. Each of the test values presented in the tables is the arithmetic mean of five separate test measurements.

The effectiveness of the mixtures according to the present invention in comparison to conventional resin sizes is explained in greater detail on the basis of the following applications:

| Application 1: | Paper material of ground bleached softwood without filler Ground to 22° SR |
|---|---|
| I conventional sizing medium | fully saponified, chemically enriched resin size (B) as in Example 1 |
| II mixture according to the present invention | combination of the resin size (B) with polymer (A1) as in Example 1 |
| Aluminum sulfate addition | 3% wt/atro paper |

| Dose Relative to Dry Substance Sizing Medium | Burst Resistance (Mullen-Test) | | | | Sizing Effect (Cobb-Test) (g/m$^2$) | |
|---|---|---|---|---|---|---|
| | (N/cm$^2$) I | Diff. (%) | (N/cm$^2$) II | Diff. (%) | I | II |
| 0.0% | 15.0 | — | 15.0 | — | 200 | 200 |
| 0.25% | 15.0 | ±0.0 | 17.1 | +14.0 | 105 | 55 |
| 0.50% | 15.0 | ±0.0 | 17.9 | +19.3 | 63 | 38 |
| 0.75% | 15.0 | ±0.0 | 18.8 | +28.8 | 35 | 23 |
| 1.00% | 14.6 | −2.7 | 19.2 | +31.5 | 25 | 19 |
| 1.25% | 14.8 | −1.3 | 21.0 | +38.2 | 21 | 18 |
| 1.50% | 14.4 | −4.0 | 22.2 | +48.0 | 19 | 17 |

The dependency of burst resistance on the relative quantities of I and II used is shown by the following diagram:

The dependency of burst resistance on the relative quantities of I and II that are used is shown in the following diagram:

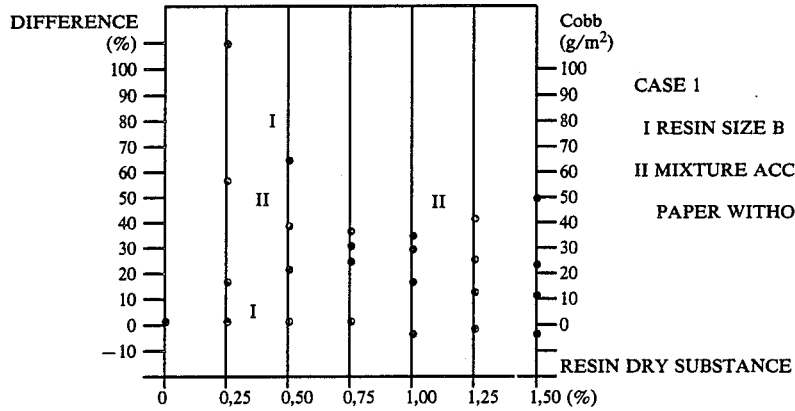

CASE 1

I RESIN SIZE B

II MIXTURE ACCORDING TO INVENTION

PAPER WITHOUT FILLER

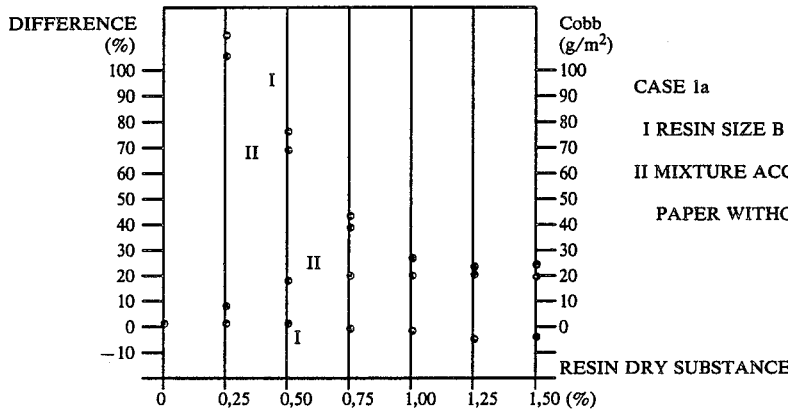

CASE 1a

I RESIN SIZE B

II MIXTURE ACCORDING TO INVENTION

PAPER WITHOUT FILLER

| Application 1a: | Paper material of ground bleached softwood without filler Ground to 22° SR |
| --- | --- |
| I conventional sizing medium | fully saponified, chemically enriched resin size (B) as in Example 1 |
| II mixture according to the present invention | combination of resin size (B) with polymer (A1a) as in Example 1a |
| Aluminum sulfate addition | 3% wt atro paper |

| Dose Relative to Dry Substance Sizing Medium | Burst Resistance (Mullen-Test) | | | | Sizing Effect (Cobb-Test) (g/m²) | |
| --- | --- | --- | --- | --- | --- | --- |
| | (N/cm²) I | Diff. (%) | (N/cm²) II | Diff. (%) | I | II |
| 0.0% | 15.2 | — | 15.2 | — | 200 | 200 |
| 0.25% | 15.1 | −0.7 | 16.2 | +6.6 | 115 | 102 |
| 0.50% | 15.2 | ±0.0 | 17.8 | +17.1 | 75 | 68 |
| 0.75% | 14.8 | −2.6 | 18.1 | +19.1 | 42 | 37 |
| 1.00% | 14.7 | −3.3 | 18.4 | +21.0 | 25 | 23 |
| 1.25% | 14.4 | −5.3 | 18.5 | +21.7 | 22 | 20 |
| 1.50% | 14.5 | −4.6 | 18.6 | +22.4 | 20 | 19 |

| Application 1b: | Paper material of ground bleach softwood without filler Ground to 22° SR |
| --- | --- |
| I conventional sizing medium | fully saponified, chemically enriched resin size (B) as in Example 1 |
| II mixture according to the present invention | combination of resin size (B) with the polymer (A1b) as in Example 1b |
| Aluminum sulfate addition | 3% wt atro paper |

| Dose Relative to Dry Substance Sizing Medium | Burst Resistance (Mullen-Test) | | | | Sizing Effect (Cobb-Test) (g/m²) | |
| --- | --- | --- | --- | --- | --- | --- |
| | (N/cm²) I | Diff. (%) | (N/cm²) II | Diff. (%) | I | II |
| 0.0% | 15.2 | — | 15.2 | — | 200 | 200 |
| 0.25% | 15.1 | −0.7 | 15.4 | +1.3 | 115 | 97 |
| 0.50% | 15.2 | ±0.0 | 15.8 | +3.9 | 75 | 52 |
| 0.75% | 14.8 | −2.6 | 15.9 | +4.6 | 42 | 35 |
| 1.00% | 14.7 | −3.3 | 16.2 | +6.6 | 25 | 21 |
| 1.25% | 14.4 | −5.3 | 16.1 | +5.9 | 22 | 19 |
| 1.50% | 14.5 | −4.6 | 16.2 | +6.6 | 20 | 18 |

The dependency of burst resistance on the relative quantities of I and II used is shown in the following diagram:

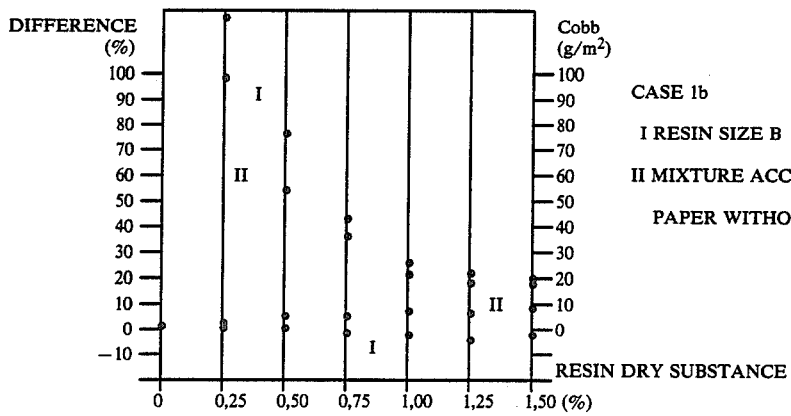
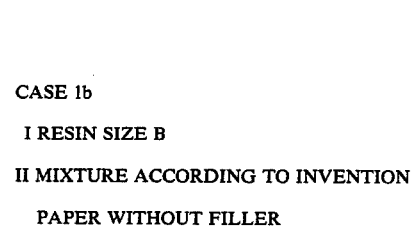

CASE 1b

I RESIN SIZE B

II MIXTURE ACCORDING TO INVENTION

PAPER WITHOUT FILLER

| Application 2: | Paper material of ground bleached softwood without filler with 10% china clay filler. Ground to 53° SR |
| --- | --- |
| I conventional sizing medium | fully saponified chemically enriched resin size (B) as in Example 1 |
| II mixture according to the present invention | combination of resin size (B) with polymer (A2) as in Example 2 |
| Aluminum sulfate addition | 3% wt/atro paper |

| Dose Relative to Dry Substance Sizing Medium | Burst Resistance (Mullen-Test) | | | | Sizing Effect (Cobb-Test) (g/m²) | |
| --- | --- | --- | --- | --- | --- | --- |
| | (N/cm²) I | Diff. (%) | (N/cm²) II | Diff. (%) | I | II |
| 0.0% | 21.0 | — | 21.0 | — | 200 | 200 |
| 0.5% | 20.6 | −1.9 | 23.3 | +11.0 | 112 | 54 |
| 1.0% | 20.3 | −3.3 | 24.4 | +16.2 | 52 | 33 |
| 1.5% | 20.0 | −4.8 | 25.4 | +21.0 | 34 | 24 |
| 2.0% | 20.2 | −3.8 | 26.5 | +26.2 | 27 | 21 |
| 2.5% | 19.2 | −6.7 | 28.0 | +33.3 | 23 | 20 |
| 3.0% | 19.8 | −5.7 | 29.2 | +39.1 | 20 | 17 |

The dependency of burst resistance on the relative quantities of I and II used is shown in the following diagram:

| Application 3: | Paper material of ground bleached softwood without filler Ground to 22° SR |
| --- | --- |
| I conventional sizing medium | partly saponified, chemically enriched resin dispersion (C) as in Example 3 |
| II mixture according to the present invention | combination of the resin dispersion (C) with polymer (A1) as in Example 3 |
| Aluminum sulfate addition | 3% wt/atro paper |

| Dose Relative to Dry Substance Sizing Medium | Burst Resistance (Mullen-Test) | | | | Sizing Effect (Cobb-Test) (g/m²) | |
| --- | --- | --- | --- | --- | --- | --- |
| | (N/cm²) I | Diff. (%) | (N/cm²) II | Diff. (%) | I | II |
| 0.0% | 15.0 | — | 15.0 | — | 200 | 200 |
| 0.25% | 15.2 | +1.3 | 16.8 | +12.0 | 200 | 66 |
| 0.50% | 14.9 | −0.7 | 18.1 | +20.7 | 115 | 28 |
| 0.75% | 14.7 | −2.0 | 18.9 | +26.0 | 46 | 20 |
| 1.00% | 14.6 | −2.7 | 19.3 | +28.7 | 22 | 19 |
| 1.25% | 14.6 | −2.7 | 20.1 | +34.0 | 20 | 18 |
| 1.50% | 14.2 | −5.3 | 20.8 | +38.7 | 18 | 16 |

The dependency of burst resistance on the relative quantities of I and II used is shown in the following diagram:

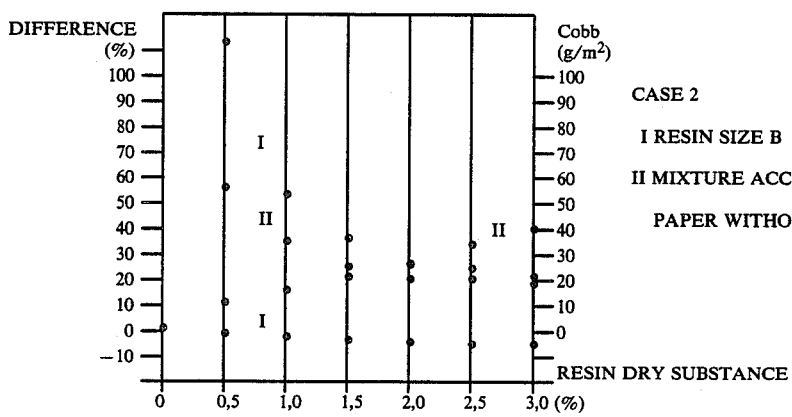
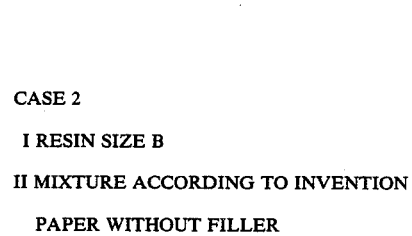

CASE 2

I RESIN SIZE B

II MIXTURE ACCORDING TO INVENTION

PAPER WITHOUT FILLER

BURST RESISTANCE

SIZING EFFECT

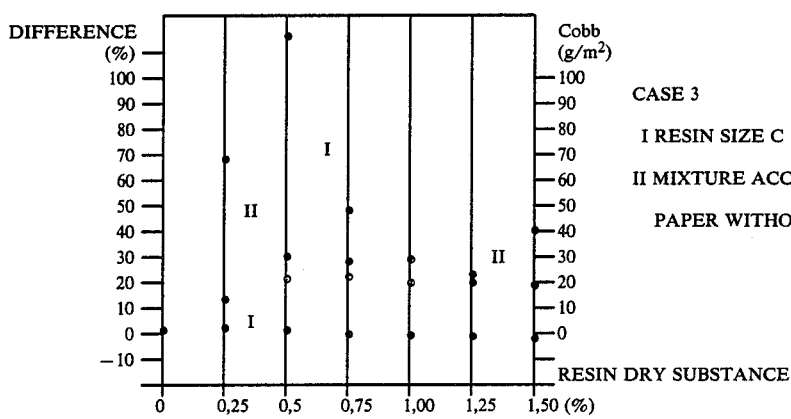

CASE 3

I RESIN SIZE C

II MIXTURE ACCORDING TO INVENTION

PAPER WITHOUT FILLER

| Application 3a: | Paper material of ground bleached softwood without filler Ground to 22° SR |
|---|---|
| I conventional sizing medium | partly saponified, chemically enriched resin dispersion (C) as in Example 3 |
| II mixture according to the present invention | combination of the resin dispersion (C) with polymer (A1) as in Example 3a |
| Aluminum sulfate addition | 3% wt/atro paper |

| Dose Relative to Dry Substance Sizing Medium | Burst Resistance (Mullen-Test) | | | | Sizing Effect (Cobb-Test) (g/m²) | |
|---|---|---|---|---|---|---|
| | (N/cm²) I | Diff. (%) I | (N/cm²) II | Diff. (%) II | I | II |
| 0.0% | 15.0 | — | 15.0 | — | 200 | 200 |
| 0.25% | 15.2 | +1.3 | 15.6 | +4.0 | 200 | 125 |
| 0.50% | 14.9 | −0.7 | 15.8 | +5.3 | 115 | 48 |
| 0.75% | 14.7 | −2.0 | 16.0 | +6.7 | 46 | 33 |
| 1.00% | 14.6 | −2.7 | 16.1 | +7.3 | 22 | 20 |
| 1.25% | 14.6 | −2.7 | 16.2 | +0.8 | 20 | 19 |
| 1.50% | 14.2 | −5.3 | 16.4 | +9.3 | 18 | 19 |

The dependency of burst resistance on the relative quantities of I and II used is shown in the following diagram:

BURST RESISTANCE

SIZING EFFECT

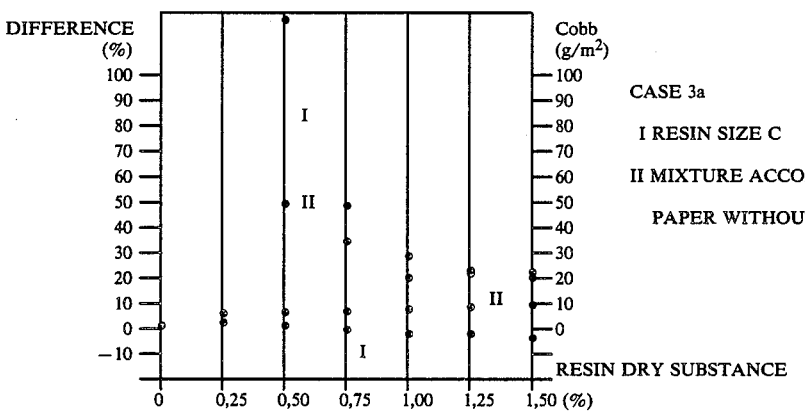

CASE 3a

I RESIN SIZE C

II MIXTURE ACCORDING TO INVENTION

PAPER WITHOUT FILLER

We claim:

1. A mixture comprising (A) a polymer comprising by weight at least 80% of at least one of acrylamide or methacrylamide, up to 5% of at least one of acrylonitrile, methacrylonitrile, vinyl acetate, maleic acid, diisobutane, or a (meth)acrylic acid ester of a monovalent primary alcohol with 1 to 5 carbon atoms, and 5 to 20% of at least one of acrylic acid or methacrylic acid, and at least one of (B) a completely saponified rosin, balsam resin or wood resin or (C) a partially saponified rosin, balsam resin or wood resin, (A) being present in 3 to 50% and (B), (C) or (B) plus (C) being present in 97 to 50% by weight of (A) plus (B), (C) or (B) plus (C).

2. A mixture according to claim 1, wherein (A) is produced by polymerization of the appropriate monomers at a pH less than 7.

3. A mixture according to claim 1, wherein (A) is at least in part in the form of a water-soluble salt.

4. A mixture according to claim 3, wherein the salt is an alkali metal or ammonium salt.

5. A mixture according to claim 1, wherein a 2% aqueous solution of (A) has a viscosity of 5 to 100 mPa×s.

6. A mixture according to claim 1, wherein a 2% aqueous solution of (A) has a viscosity of 20 to 100 mPa×s.

7. A mixture according to claim 1, wherein the rosin, balsam resin or wood resin is fully saponified.

8. A mixture according to claim 1, wherein (B) and (C) are enriched rosins.

9. A mixture according to claim 1, wherein (B) and (C) are tall oil rosins.

10. A mixture according to claim 1, further containing at least one member selected from the group consisting of a preservative, colouring agent, odourant, moistener and protective colloid.

* * * * *